United States Patent [19]

Mochizuki et al.

[11] Patent Number: 4,900,649

[45] Date of Patent: Feb. 13, 1990

[54] METHOD OF PRODUCING AN OPTICAL RECORDING MEDIUM AND AN OPTICAL RECORDING MEDIUM PRODUCED THEREBY

[75] Inventors: Hideaki Mochizuki, Higashiosada; Tooru Tamura, Ikeda; Kenichi Takahashi, Kyoto; Mitsuaki Oshima, Moriguchi, all of Japan

[73] Assignee: Matsushita Electric Industrial Co., Ltd., Osaka, Japan

[21] Appl. No.: 932,641

[22] Filed: Nov. 19, 1986

[30] Foreign Application Priority Data

Nov. 19, 1985 [JP] Japan .................................. 60-258928
Dec. 9, 1985 [JP] Japan .................................. 60-276337

[51] Int. Cl.$^4$ .............................................. G03C 5/00
[52] U.S. Cl. .................................... 430/311; 430/270;
430/271; 430/339; 430/945; 346/1.1; 346/76 L;
346/77 E; 346/135.1
[58] Field of Search ............... 428/694, 688, 689, 913,
428/64, 65; 430/945, 339, 270, 271, 311; 346/77
E, 1.1, 135.1, 76 L; 264/104

[56] References Cited

U.S. PATENT DOCUMENTS 3,615,562 10/1971 Harrison et al. ..................... 430/339
3,787,873 1/1974 Sato et al. .
4,097,895 6/1978 Spong .
4,270,130 5/1981 Houle et al. ......................... 430/945
4,380,769 4/1983 Thomas et al. .
4,408,319 10/1983 Tsunoda et al. ................. 346/135.1
4,450,553 5/1984 Holster et al. ................... 346/135.1
4,629,668 12/1986 Hamersley et al. .................. 430/11
4,645,712 2/1987 Ishigaki et al. ..................... 428/433

OTHER PUBLICATIONS

Willard, H. et al., "Instrumental Methods of Analysis, 6th ed.", Nostrand Company, New York, p. 4 (1981).
Bartolini, R. A. et al., "Optical Disk Systems Emerge", IEEE Spectrum, Aug. 1978, pp. 20–28.

Primary Examiner—Ellis P. Robinson
Assistant Examiner—P. Ryan
Attorney, Agent, or Firm—Wenderoth, Lind & Ponack

[57] ABSTRACT

A method of producing an optical recording medium according to the present invention includes the steps of forming a recording film on a transparent substrate, recording signals in the form of perforated pit rows on the recording film by a laser beam, and forming a reflection layer on the recording film on which the pit rows have been formed. The recording film is bleached after recording or the laser beam used for recording is selected to have a wavelength different from that of a laser beam used for reproducing so that the recording film is transparent to the laser beam used for reproducing.

7 Claims, 1 Drawing Sheet

METHOD OF PRODUCING AN OPTICAL RECORDING MEDIUM AND AN OPTICAL RECORDING MEDIUM PRODUCED THEREBY

BACKGROUND OF THE INVENTION

1. Field of the Invention

This invention relates to an optical signal recording medium.

2. Description of the Prior Art

Optical recording media, in particular, optical disks, which have been rapidly developed recently, are expected to be used for a variety of purposes and applications as the market expands. Optical disks may be roughly divided into two categories, that is, read-only disks and rewritable disks. The former type is produced by transferring patterns of information formed on a stamper to a transparent substrate by injection molding, and evaporating aluminum on the information-transferred. Although the stamper is expensive, a large number of disks (more than 10,000) having the same information can be produced by using a single stamper. Thus, the former type is suitable to mass-production for a manufacturer. The music compact disc (CD), is a typical example of the former type.

This method, however, is not suited to small scale productions such as the production of personal information files or personal music software. This is because the production of the stamper requires an extremely precise cutting machine and a large scale developing process. Not only is the stamper expensive, but it also lacks flexibility in software production because the software and the stamper must be produced in different companies or locations. These are factors which raise the production cost per signal recording medium.

On the other hand, the rewritable optical disk is produced by forming an optical recording film on a surface of a transparent substrate on which shallow grooves for tracking have been formed, and providing a protective layer opposing the surface with a gap therebetween. This construction is suitable for personal use, but the medium in the unrecorded state is, in itself, expensive. Besides, since the same laser beam is used for recording and reproducing, if the same position is repeatedly subjected to the laser beam for a long time, the recorded signal will gradually deteriorate, or the output for recording may be used by mistake when reproducing, thereby damaging the recorded signal. Hence, it is not an inexpensive and highly reliabile optical recording medium. Moreover, since the reflectivity from the recording surface is low, being less than 40%, and the thickness is more than twice that of a CD, it requires a reproducing apparatus that is different from CD players. The rewritable optical disk is disclosed, for instance, in Japanese Unexamined Patent Publications No. 59-24692 and No. 60-35054, while a read-only optical disk is explained, for example, in NIKKEI ELECTRONICS, Aug. 17, 1981.

Incidentally, a method of bleaching a signal-recorded film, and reproducing pits on the recorded film is disclosed in U.S. Pat. No. 4,270,130. Since this method includes recording a signal after forming a flat reflection film, it is accompanied by energy loss due to heat conduction by the reflection layer at the time of recording, and a large amount of power is needed for recording. Besides, in order to obtain an error rate similar to that of a CD, the optical path from the substrate surface to the recorded surface must be set to the same distance as in a CD, and for this purpose, a sandwich structure is indispensable. As a result, the total thickness becomes about twice that of a CD.

SUMMARY OF THE INVENTION

It is, therefore, a primary object of this invention to produce read-only optical disks with software (hereinafter called ROM disks) in a quantity of less than several hundreds, at low cost and easily in the field of software production. Since this type of disk is distributed to the end users in the form of ROMs, the disks are stable if reproduced repeatedly, and the signals are not damaged even if a large power (for instance, power for writing) is used by mistake, which means the reliability is high. Moreover, since the thickness and reflectivity are similar to that of the existing CD, they may be compatible with the CD.

To achieve the above-described object, in this invention, an optical recording film on which signals can be recorded in the form of perforated pits with a laser beam is formed on a transparent substrate. The optical recording film absorbs the laser beam for recording at the time of recording, but is almost transparent to the laser beam recording at the time of reproducing. After recording signals have been recorded on the optical recording film, a reflection layer is formed on the surface having the signal pits. In this structure, when reproducing, the reproduction light passes through the transparent substrate and the transparent recording film and is focused on the reflection layer, so that the signal pit rows formed on the reflection film can be read out. Since the recorded film is transparent to the reproduction light, the pit shape is not changed even if read out power is large. Besides, when aluminum is used as the reflection layer, it is possible to obtain a high reflectivity and to facilitate compatibility with an existing CD.

Meanwhile, since this forming process of the reflection layer occurs after the production of software, it may be manufactured separately by large-scale equipment, or may be processed in a small scale at the shop where the software is produced.

DESCRIPTION OF THE PREFERRED EMBODIMENTS

Figure 1:
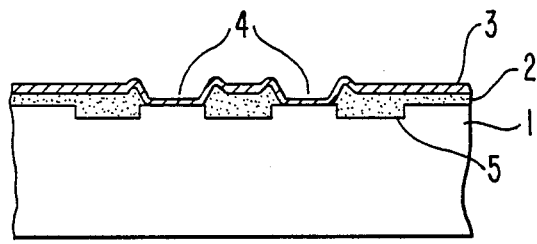
FIG. 1 is sectional view of an optical disk produced by the method according to the present invention.
Figure 2:
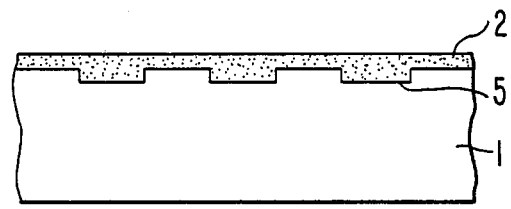
FIG. 2 and FIG. 3 are sectional perspective views, respectively, showing states of the medium in the production process.
Figure 3:
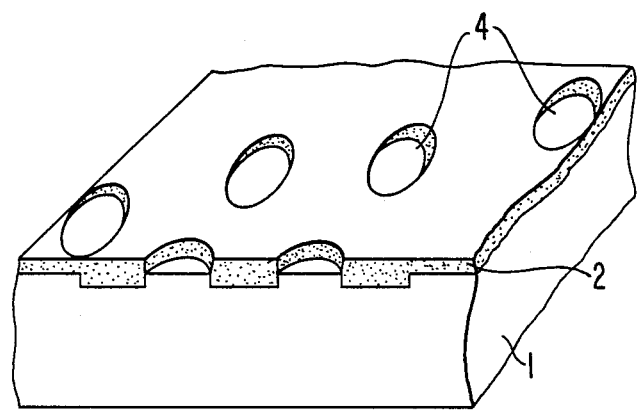

An optical recording medium is produced by a method comprising four steps: a first step of forming a bleachable recording film 2 on a transparent substrate 1 on which empty grooves 5 for tracking servo are formed so that an exposed surface of the recording film 2 becomes as flat as possible as shown in FIG. 2; a second step of writing signals in the form of pit rows 4 with a collimated laser beam while applying the tracking servo on the flat recording film surface as shown in FIG. 3; a third step of bleaching the remained recording film 2 without deforming it; and a fourth step of forming a reflection layer 3 on the recording film having the recorded pit rows as shown in FIG. 1. It should be noted that, the order of the third step and fourth step may be reversed.

The grooved transparent substrate 1 used in the first step is preferably made of a material which does not absorb light in the wavelength region of semiconductor laser lights, and practically consists of a molded substrate made of polycarbonate or polymethacrylate resin, or a substrate with grooves formed by using a photosetting resin on a flat transparent substrate of glass or methacrylate resin.

The material of the optical recording film should be such that the spectral absorption characteristic is present in the wavelength region of semiconductor laser lights, and that perforated pit rows are formed by a collimated semi-conductor laser light, and that the unrecorded portion is bleached when irradiated with a specific light, so that the spectral absorption characteristic disappears. Practically, an organic pigment, or a pigment dispersed in transparent resin, or in particular any material containing at least one component of cyanine pigment is suitable as the recording film material.

As a method of coating the substrate with the recording film, spin coating is most preferable, but it is also possible to use dipping, roller coating, or flow coating. Incidentally, in order to raise the solvent resistance of the surface of the grooved substrate, it is also possible to form a thin protective film to an extent that does not change the groove shape on the surface before forming the recording film.

In the third step of bleaching the recording film, a process of irradiating with light to oxidize and decompose the functional group of pigment molecules to disclose the recording film yields excellent results. By this process, the film can be bleached without changing the shape of the recorded pits. In the fourth step of forming the reflection layer, a high reflectivity may be easily obtained by evaporating aluminum. Or, for protection of the reflection layer, a fifth process may be added to provide a protective film on the reflection layer.

This invention will be further described herein according to several Examples.

EXAMPLE 1

A protective film of SiO$_2$ of 10 nm was sputtered on the grooved surface of a methacrylate resin substrate 1 having a thickness of 1.2 mm in, tracking grooves 0.08 $\mu$m, deep and 0.8 $\mu$m wide spirally formed on the surface at a 1.6 $\mu$m pitch methylene chloride solution of iodide-1,1'-diethyl-2,2'-quinotricarbocyanine was applied thereon by spin coating at 500 rpm, whereby a 20-nm thick recording film 2 was formed. The substrate having the recording film was rotated while applying a tracking servo, and a 4 mW semi-conductor laser beam having a wavelength of 830 nm was irradiated at a line velocity of 1.4 m/sec. through a transparent substrate. The written signal 4 was a 500 kHz pulse with a duty ratio of 50/50. After recording, 50 nm aluminum 3 was evaporated on the surface, and light was irradiated from a xenon lamp of 3000 mJ/cm$^2$ through the substrate surface, so that the unrecorded portion was bleached. When the thus completed optical disk was reproduced by a commercial CD player, a reproduction C/N ratio of 55 dB was obtained at the band width of 30 Hz, and it was verified that the disk could be reproduced by a commercial CD player.

EXAMPLE 2

On a grooved substrate similar to that used in Example 1, a 10 nm SiO$_2$ layer was similarly formed, and the following pigment was applied by 200 nm spin coating process:

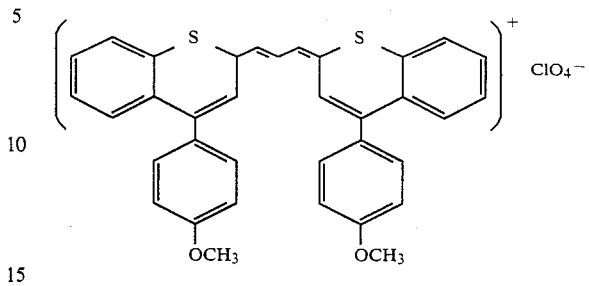

The same signal was recorded in the same condition as in Example 1.

After recording, the entire substrate surface was irradiated with a xenon lamp of 3000 mJ/cm$^2$ for bleaching, and thereafter 50 nm aluminum was evaporated on the surface to form a reflection layer. When the disk was reproduced by a commercial CD player, a reproduction C/N ratio of 53 dB was obtained at the band width of 30 kHz, and it was verified that the disk could be reproducible by a commercial player.

EXAMPLE 3

On a smooth thermo-setting epoxy resin substrate having a thickness of 1.2 mm and a diameter of 120 mm, methylene chloride solution of iodide-1,1'-diethyl-2,2'-quinotricarbocyanine was applied by spin coating at 1500 rpm, whereby a 70 nm thick recording film 2 was formed. This substrate having the recording film 2 was rotated so that the relative moving speed of the laser beam on the substrate was 1.3 m/sec., and while applying a focus servo, the substrate was irradiated with a semiconductor laser beam having a wavelength of 830 nm at 4 mW, through a transparent substrate 1, while concurrently feeding the substrate 1.6 $\mu$m in the radial direction. The written signal was a 500 kHz pulse with a duty ratio of 50/50. After recording, the substrate was irradiated with a xenon lamp of 2000 mJ/cm$^2$ to bleach the unrecorded portion, and aluminum was evaporated thereon in a thickness of 50 nm to form a reflection film 3. The completed optical disk was reproduced by using a commercial CD player, and a reproduction C/N ratio of 51 dB was obtained at band width of 30 kHz. By using the same CD player, a same pit area was reproduced by 1 million times, but any deterioration of the C/N ratio was not recognized. By recording music signals into this disk, it was reproduced by the same CD player, and a symbol error rate of $1.1 \times 10^{-4}$ was obtained.

EXAMPLE 4

A 20 nm SiO$_2$ film was formed, as protective film, on a polycarbonate resin substrate measuring 1.2 mm thick and 120 mm in diameter, and a methyl-ethyl keton solution of the following pigment was applied by rotating at 100 rpm:

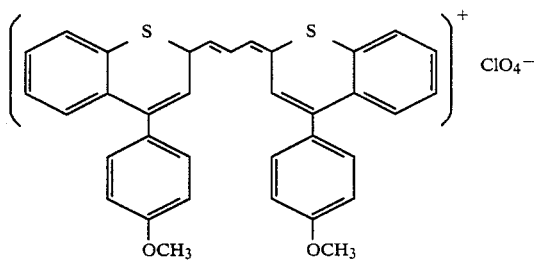

whereby a recording film was formed having a thickness of 100 nm. The same signal was recorded in the same way as in Example 1.

After recording, the entire surface was irradiated with a xenon lamp of 3000 mJ/cm² for bleaching, and thereafter the surface was evaporated with 50 nm aluminum to form a reflection layer. This disk was reproduced, as in Example 1, by using the same commercial CD player, and a reproduction C/N ratio of 53 dB was obtained at the band width of 30 kHz, and it was confirmed that such a disk can be reproduced by a commercial CD player.

Another method of this invention will be described below.

This method comprises three steps: a first step of forming a recording film 2 on a transparent substrate 1 having empty grooves 5 for tracking servo so that an exposed surface of the recording film becomes flat as shown in FIG. 2; a second step of writing signals as perforated pit rows 4 by using a collimated laser beam having a specific wavelength while applying the tracking servo on the flat recording surface as shown in FIG. 3; and a third step of forming a reflection layer 3 on the recording film having recorded pit rows as shown in FIG. 1.

The grooved transparent substrate 1 used in the first step is preferably made of material that can not absorb light in the wavelength region of over 400 nm, and practically is a molded substrate made of polycarbonate or polymethacrylate resin, or a smooth transparent substrate made of glass or methacrylate resin with grooves formed by using a photosetting resin.

The optical recording film material to be used is required to possess the following properties: that is, a spectral absorption characteristic of not more than 10% in the oscillation wavelength region of a semiconductor laser, that is, from 750 nm to 850 nm, and the material must respond to the laser beam at less than 750 nm so as to record by perforation. Suitable materials are organic pigment, oraganic metal complex, and their compound with thermoplastic resin.

The method of forming the recording film on the substrate comprises initially melting the recording material, and applying this molten solution on the substrate by spin coating, dipping, roller coating or flow coating. It is also possible to form the recording film by evaporation. In order to protect the substrate surface from solvent or a temperature rise when evaporating, the substrate surface may be precoated with a protective film of less than tens of nanometers.

The laser used to record signals from an external information source possesses a wavelength of less than 750 nm, and it is satisfactory to have an oscillation wavelength close to the wavelength showing the spectral absorption characteristic of the recording film material being used, and practical examples include a helium-neon laser, an argon ion laser, a krypton ion laser, and a helium-cadmium laser. Using these lasers, while applying servo tracking by using the grooves formed on the transparent substrate, signals are written on the flat recording surface in the form of perforated pit rows.

A reflection layer is formed on these pits. By evaporating aluminum a most satisfactory reflection layer can be formed. Besides, to protect the reflection layer, one more step may be added to apply a protective film thereon.

This method will be further explained below according to several Examples.

EXAMPLE 5

On the grooved surface of a polycarbonate resin substrate 1 having a thickness of 1.2 mm, tracking grooves 0.05 μm deep and 0.8 μm wide formed spirally at a pitch of 1.6 μm, $SiO_2$ was sputtered in a thickness of 10 nm, and a methylene chloride solution of iodide 3.3'-diethyel-2,2'-selenacarbocyanine was applied by spin coating at 1000 rpm thereon, whereby a 20 nm thick recording film 2 was formed. By rotating the substrate on which the recording film 2 was formed, while applying the tracking servo, rectangular pulse signals having a duty ratio of 50/50 at 500 kHz were written, by an irradiating heliumm neon laser beam of 633 nm (output, 20 mW), in the transparent substrate 1. Aluminum was evaporated on the recording film having the written perforated pits 4 to a thickness of 50 nm, whereby an optical disk was produced. When this disk was reproduced by a commercial CD player, a reproduction C/N ratio of 50 dB was obtained at band width of 30 kHz. That is, the optical disk was confirmed to be reproducible by a commercial CD player.

EXAMPLE 6

On a grooved polymethacrylate resin substrate having the same shape as in Example 5, a methanol solution of iodide-1,3'-diethyl-2,2'-quino-thiacyanine was applied by spin coating in a thickness of 200 nm, and rectangular pulses with a duty ratio of 50/60 at 500 kHz were written by using an argon ion laser (output, 40 mW). Thereon, aluminum was evaporated in a thickness of 40 nm, whereby an optical disk was produced. This disk could be reproduced by a commercial CD player, and a reproduction C/N ratio of 49 dB was obtained at the band width of 30 kHz.

In FIG. 1, incidentally, the recorded pits 4 are not located within the empty grooves 5. This is so-called on-land recording. But the same effect can be obtained in the in-groove recording having pits 4 formed in the empty grooves 5.

The above examples referred solely to disk-shaped medium. However, this invention can be applied to card-shaped medium or tape-shaped medium and the like. The laser beams used in the above examples may be replaced by any other light beams. In particular, recording may be carried out by irradiating a recording medium with a non-collimated light through a perforated mask.

What is claimed is:

1. A method of producing an optical recording medium, said method comprising:
   forming an optical recording film comprising an organic pigment which substantially absorbs only light having a wavelength within a predetermined range of wavelengths on a transparent substrate;

forming a series of pits in said recording film by only subjecting the outer surface of said recording film to a laser beam having a wavelength within said predetermined range so that said outer surface is perforated under the absorption of the laser beam by said optical recording film to record signals thereon; and forming a reflection layer on the perforated recording film that extends over said surface of the recording film and into said pits to conform to said series of pits so that the recorded signals are reproducible by a laser beam having a wavelength outside of said predetermined range and directed on said reflection layer through the substrate and the recording film.

2. A method as claimed in claim 1, wherein the forming of a series of pits comprises only subjecting the outer surface of said recording film to a laser beam having a wavelength of less than 750 nm, and the forming of the recording film comprises forming a recording film on the substrate with a material comprising an organic pigment that does not significantly absorb light having a wavelength between 750 nm and 800 nm.

3. A method as claimed in claim 1, wherein the forming of the optical recording film comprises forming an optical recording film comprising the organic pigment on a transparent substrate having grooves therein and forming the outer surface of the recording film as a flat surface, and further comprising using tracking servo tracked by the grooves to control the laser beam in the formation of the series of pits.

4. A method of producing an optical recording medium, said method comprising:

a first step of forming a recording film comprising an organic pigment which substantially absorbs only light having a wavelength within a predetermined range of wavelengths on a transparent substrate;

a second step of forming rows of pits in an exposed surface of the recording film corresponding to signals by only subjecting the exposed surface of said film to a laser beam having a wavelength within said predetermined range so that said outer surface is perforated under the absorption of the laser beam by said optical recording film;

a third step of controlling the laser beam with an external information source;

a fourth step of bleaching the recording film without altering the shape of the pits; and a fifth step of forming a reflection layer on the recording film that extends over said surface of the recording film and into the pits to conform to said rows of pits so that the signals are reproducible by a laser beam directed on said reflection layer through the transparent substrate and the recording film.

5. A method as claimed in claim 4, wherein said first step comprises forming a recording film comprising the organic pigment said pigment absorbing a light having a wavelength between 700 nm and 900 nm on a transparent substrate having grooves therein and forming the exposed surface of the recording film as a flat surface, and said third step includes using tracking servo tracked by the grooves in the perforation of the recording film.

6. A method as claimed in claim 4, wherein said fourth step comprises bleaching the surface of the recording film by irradiating said surface with a xenon lamp.

7. A method as claimed in claim 4, wherein said fifth step comprises forming a reflection layer by evaporating aluminum.

* * * * *